This invention relates generally to cattle feeders of the general type shown in my U.S. Patent No. 3,108,571, issued October 29, 1963, entitled, "Arcuate Bunk Feeder With Automatic Reversible Feed Conveyor Mechanism." More specifically, the invention relates to an attachment for such a feeder which permits the operator to selectively fill different portions of the length of the feed bunk.

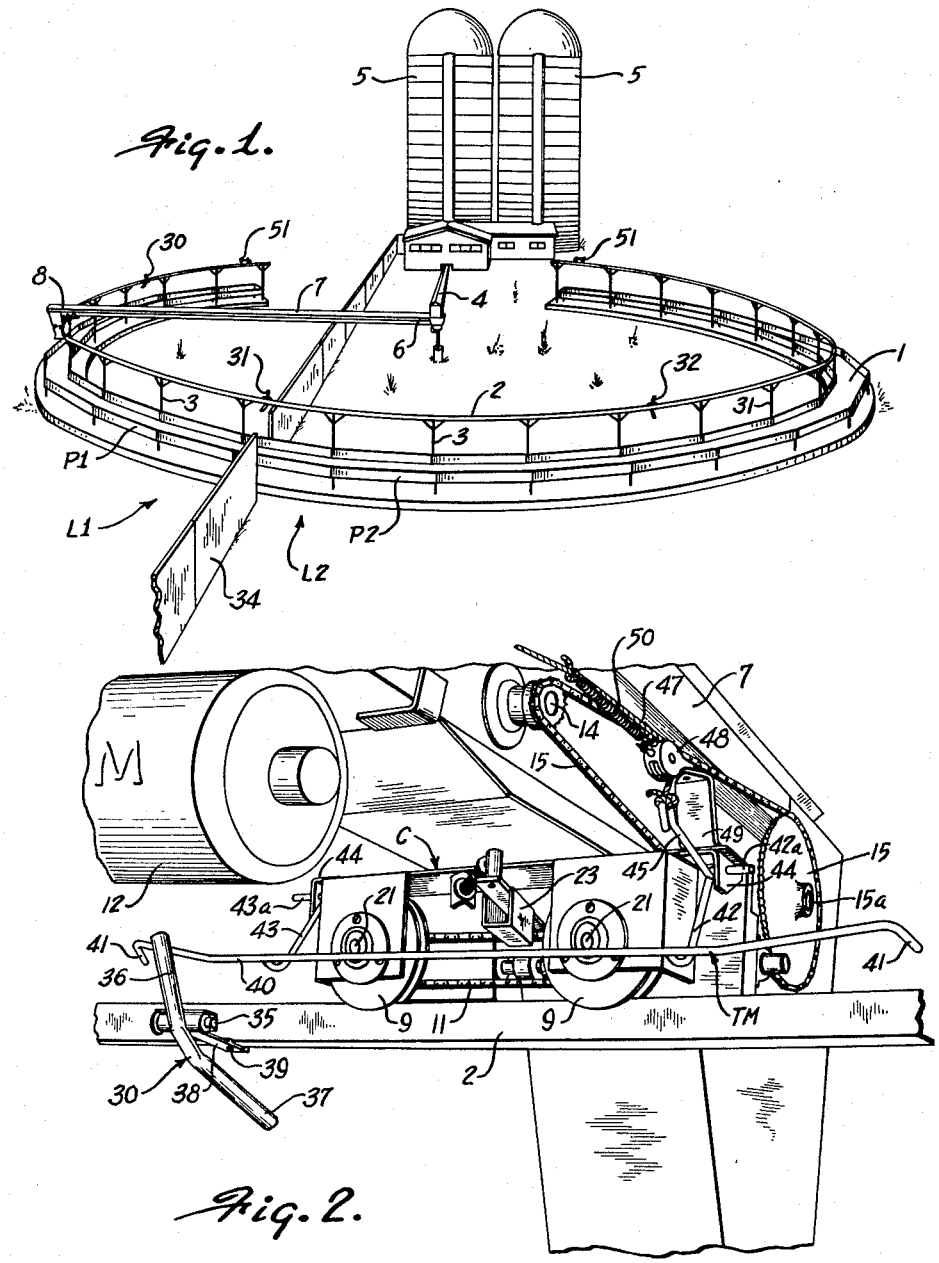

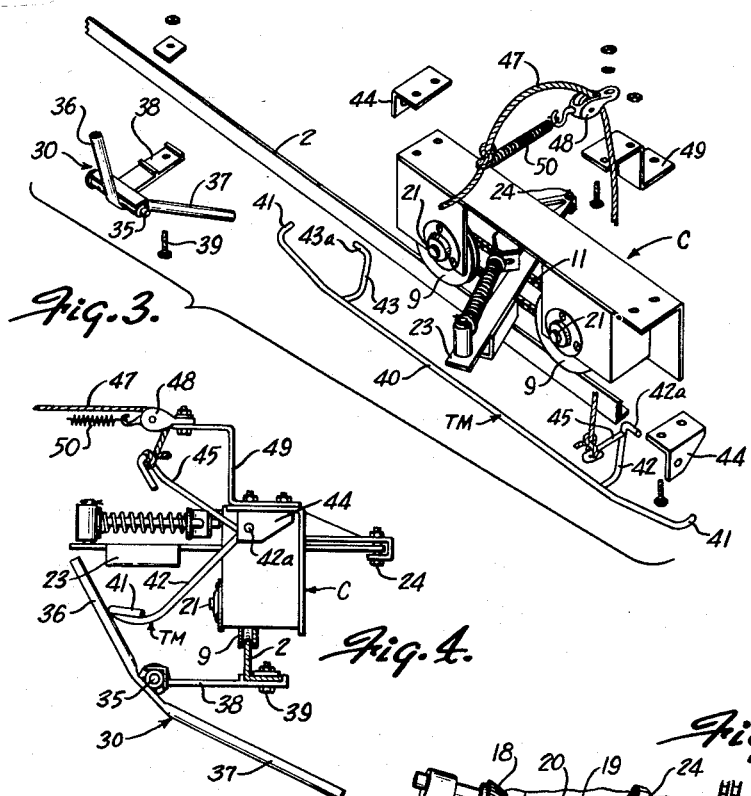
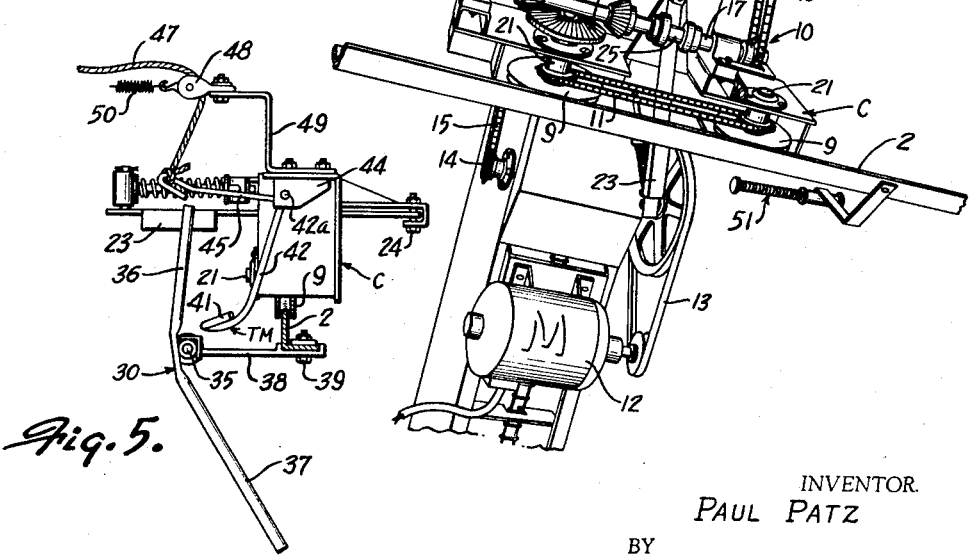
INVENTOR.
PAUL PATZ 3,173,399
ARCUATE BUNK FEEDER WITH ADJUSTABLE REVERSING FEED CONVEYOR TRIP MECHANISM
Paul Patz, Pound, Wis.
Filed Sept. 30, 1963, Ser. No. 312,507
5 Claims. (Cl. 119—51)

Cattle feeders of the type with which the present invention is used have an arcuate bunk which is often of considerable length, sometimes comprising almost a complete circle and being of considerable radius. An overhead rail is located above and co-extensive with these bunks for the purpose of guiding a delivery conveyor therealong, which conveyor swings or pivots about the center of the arcuate bunk and delivers feed along the length of the bunk. The conveyor has means for reversing its direction of swing, so that it automatically oscillates along the guide rail; trip means are mounted on the rail at desired locations for causing the reversing mechanism on the conveyor to be actuated, to thereby cause said automatic oscillation of the conveyor.

It is desirable in many feed lot set-ups to be able to distribute the feed in different quantities along certain portions of the bunk. In other words, it may be desirable to distribute the feed to any bunk section along the entire bunk or to several separated bunk sections.

Accordingly, the present invention provides a feed lot divider attachment for a cattle feeder of the above type and by means of which the operator can control the entire reversing operation of the conveyor from the pivot point of the conveyor at any point along its length, or from any other location desired. The attachment includes a novel tripping mechanism carried by the conveyor which is selectively operable to cause the conveyor to either by-pass or to contact any one of a number of intermediate actuators located on the rail.

These and other objects and advantages of the present invention will appear hereinafter as this disclosure progresses, reference being had to the accompanying drawings, in which:

FIGURE 1 is a perspective view of a feed lot employing the bunk feeder which utilizes the present invention;

FIGURE 2 is a perspective view of the discharge end of the conveyor shown in FIGURE 1, but on an enlarged scale and the view being taken generally from underneath the conveyor;

FIGURE 3 is an exploded, perspective view of a portion of the trolley carriage, the trip mechanism, and an intermediate actuator shown in FIGURE 2;

FIGURE 4 is a fragmentary, side elevational view, showing the trip means holding the actuator out of contact with the drive reversing part of the carriage, the view being partially in section and with parts broken away or removed for clarity;

FIGURE 5 is a view similar to FIGURE 4 but showing the trip means in its other position where it permits the actuator to contact the drive reversing part of the carriage; and FIGURE 6 is a perspective view of the reversible propelling means, the view being taken generally from beneath and the outer end of the conveyor, certain parts being removed for clarity.

Referring in greater detail to the drawings, the arcuate feed bunk 1 is formed in the illustration shown as almost a complete circle and has an elevated and arcuate guide rail 2 supported on vertical posts 3 and extending above the bunk. The bunk is elevated off the ground at a convenient height to enable the cattle to feed from both sides of the bunk.

A stationary conveyor 4 may be used to convey the feed from the silos 5 to the inner or receiving end 6 of a swinging feed conveyor 7. Other means, of course, can be utilized for depositing feed into the receiving end of the horizontally swingable conveyor 7.

Thus, conveyor 7 is pivotally mounted at its inner end 6 at substantially the center of curvature of the arcuate bunk and rail.

The outer or discharge end 8 of the swinging feed conveyor is supported on the guide rail 2 by a reversible trolley carriage C which has driven wheel means 9 that ride along the rail.

As shown in FIGURE 6, the carriage has a reversible propelling means indicated generally as reference numeral 10 and which is fully described in the said Patent No. 3,108,571 and to which reference may be had if deemed necessary or desirable. As this reversing mechanism per se forms no part of the present invention, it is believed sufficient to say for purposes of this disclosure that the wheel means 9 are connected together by endless chain 11 and receive their power from the electric motor 12 (FIGURE 6) and through endless belt and sprocket drive means 13, shaft 14, endless chain and sprocket drive means 15, chain 15a (FIGURE 2), chain 16 which drives shaft 17 on which are fixed bevel gears 18 and 19. Shaft 17 is axially shiftable to cause selective engagement of either gear 18 or 19 with the common bevel gear 20 which is fixed on the same axle 21 as is one of the wheel means 9.

The reversible propelling means 10 also includes a lever 23 which is pivoted at 24 to the carriage and constitutes a shiftable part for reversing the direction of travel of the reversible propelling means and its conveyor along the guide rail. More specifically, swinging of lever 23 about its pivot point 24 acts to axially shift the shaft 17 through its yoke connection at 25 (FIGURE 6) and thereby connect either pinion gear 18 or 19 with the common ring gear 20 of the wheel means.

The above-mentioned reversible propelling means on the carriage thus has a shiftable part which is adapted to be engaged or by-passed by intermediate actuators 30, 31, and 32 mounted on the guide rail, depending on the selected position of the shiftable trip means TM mounted on the carriage and now to be referred to in detail.

Any number of actuators, such as 30, 31, and 32 may be adjustably located along the rail depending on the portions of the bunk between which it is desired to have the conveyor oscillate. In the example shown in FIGURE 1, the intermediate actuators are spaced along the bunk as indicated, and together with the end actuators 51, divide the bunk into four areas. A fence 34 may also be provided in order to divide the bunk into two separate portions and thereby keep different types or ages of animals in different feed lots L1 and L2.

The intermediate actuators are similar in construction and operation and only one will therefore be described. They are pivotally mounted intermediate their length as at 35, and have an upper part 36 which is adapted to be contacted by the shiftable trip means, and a lower part 37 which acts as a counterweight to normally maintain the actuator in the position shown in FIGURE 5 where the upper part can be contacted by said trip means. Other means, such as springs, for example, could also be used to normally bias the actuators to the FIGURE 5 position. The bracket 38 on which the actuator is pivotally mounted is adjustably securable at any location along the guide rail, in any suitable manner, as for example, by bolt means 39.

The shiftable trip means TM includes an elongated rod 40 which has a curved portion 41 on each end and which rod is arranged generally parallel to that portion of the guide rail past which it is moving. Also, this rod is spaced a distance from the rail and has a pair of arms 42, 43 extending therefrom and which are pivoted at 42a, 43a, respectively, to the brackets 44 fixed to the carriage.

Arm 42 has a hook 45 rigidly extending therefrom and to which is attached one end of the actuating line or rope 47. This rope is trained around a sheave 48 carried on the sheave bracket 49 that is fixed to the carriage.

The rope then extends along the length of the conveyor weight of the rope does not influence the position of the location, such as at the receiving end 6 of the conveyor. Thus, the rope is accessible to the operator from any one of many locations.

The weight of the rope is carried by a spring 50 which may be connected, for example, to the sheave. Thus, the weight of the rope does not influence the position of the trip means TM, regardless of the length of the rope.

*Operation*

The actuators are normally biased by their weight end 37 to a position where their upper end 36 extends upwardly so that it is engaged by the shiftable part 23 of the carriage reversing means. Thus, if the rope is not pulled by the operator and the trip means remains in the FIGURE 5 position, then the conveyor will be reversed in direction due to the shiftable part 23 being swung or shifted to the reverse direction by contact with the actuator.

On the other hand, if the rope is pulled by the operator to cause the trip means to swing to the FIGURE 4 or inoperative position, then the conveyor will move uninterruptedly past the intermediate actuator until it is reversed by other intermediate actuators, or by the end actuator 51 at the ends of the bunk.

In this manner, the operator can conveniently and selectively cause the trip means to either by-pass or contact any one of the intermediate actuators. As a result, only one portion of the bunk may be filled, or it may receive any number of passes of feed more than others. Furthermore, it may be desired to place a different type of feed or mixture in one portion of the bunk from the others, and other and various combinations of feeding arrangements are possible with the versatile feed lot divider attachment for animal feeders provided by the present invention.

Various modes of carrying out the present invention are contemplated as being within the scope of the following claims particularly pointing out and distinctly claiming the subject matter which is regarded as the invention.

I claim:

1. In a bunk feeder for animals of the type having a generally arcuate bunk, a generally arcuate guide rail arranged above said bunk, a trolley carriage on said guide rail and movable therealong, a feed conveyor having a delivery end supported by said carriage for swinging movement in either direction along said rail and also having a receiving end mounted at substantially the center of curvature of said rail, a reversible propelling means on said carriage and having a shiftable part for reversing said propelling means, the improvement comprising an actuator shiftably mounted in the swinging path of said conveyor and selectively engageable by said shiftable part to cause reversal of said conveyor movement, and trip means carried adjacent the delivery end of said conveyor and shiftable between an actuator contacting position in which said actuator is held out of engagement with said shiftable part to permit the carriage to pass thereby, and a position away from said actuator whereby the latter is engaged by said shiftable part to cause shifting thereof and reversal of said propelling means and conveyor.

2. The combination as set forth in claim 1 further characterized in that said actuator is normally biased to a position for engagement with said shiftable part.

3. The combination set forth in claim 1 further characterized in that said trip means constitutes an elongated rod arranged generally parallel to that portion of the guide rail past which it is moving.

4. In a bunk feeder for animals of the type having a generally arcuate bunk, a generally arcuate guide rail arranged above said bunk, a trolley carriage on said guide rail and movable therealong, a feed conveyor having a delivery end supported by said carriage for arcuate movement in either direction along said rail and also having a receiving end mounted at substantially the center of curvature of said rail, a reversible propelling means on said carriage and having a shiftable part for reversing said propelling means, the improvement comprising an actuator shiftably mounted on said rail and selectively engageable by said shiftable part to cause reversal of said conveyor movement, and trip means shiftably mounted on said carriage and swingable between an actuator contacting position in which said actuator is held out of engagement with said shiftable part as the carriage passes thereby, and a position away from said actuator whereby the latter contacts said shiftable part to cause reversal of said propelling means.

5. In a bunk feeder for animals of the type having a generally arcuate bunk, a generally arcuate guide rail arranged above said bunk, a trolley carriage on said guide rail and movable therealong, a feed conveyor having a delivery end supported by said carriage for arcuate movement in either direction along said rail and also having a receiving end mounted at substantially the center of curvature of said rail, a reversible propelling means on said carriage and having a shiftable part for reversing said propelling means, the improvement comprising an actuator shiftably mounted adjacent said rail and selectively engageable by said shiftable part to cause reversal of said conveyor movement, said actuator being normally biased to a position for engagement with said shiftable part, and an elongated rod shiftably mounted adjacent said conveyor delivery end and arranged generally parallel to that part of the rail past which it moves, said rod being mounted for shifting between an actuator contacting position in which said actuator is held out of engagement with said shiftable part as the carriage passes thereby, and a position away from said actuator whereby the latter contacts said shiftable part to cause reversal of said propelling means.

References Cited by the Examiner
UNITED STATES PATENTS

| 1,624,261 | 4/27 | Lilly et al. | 192—139 |
| 1,712,901 | 5/29 | Paris | 192—139 |
| 2,852,630 | 9/58 | Burrows | 192—139 |

SAMUEL KOREN, *Primary Examiner.*

ALDRICH F. MEDBERY, *Examiner.*